United States Patent [19]

Tarumi et al.

[11] 4,306,780
[45] Dec. 22, 1981

[54] HIGHLY REFRACTIVE COPOLYMER OF AN ETHYLINICALLY UNSATURATED ALKYLENE OXIDE OF BIS-PHENOL-A AND AN ETHYLINICALLY UNSATURATED AROMATIC COMPOUND FOR LENS AND A LENS PREPARED THEREFROM

[75] Inventors: Niro Tarumi; Makoto Tsuchiya, both of Tokyo; Shigeo Komiya, Akishima; Eiichi Masuhara, Tokyo, all of Japan

[73] Assignee: Hoya Lens Corporation, Tokyo, Japan

[21] Appl. No.: 57,204

[22] Filed: Jul. 13, 1979

[30] Foreign Application Priority Data

Jul. 17, 1978 [JP] Japan ................................. 53-86903

[51] Int. Cl.³ .................. G02B 5/30; C08F 228/04; C08F 220/20; C08F 220/30
[52] U.S. Cl. .................... 351/159; 526/293; 526/310; 526/311; 526/312; 526/289; 526/313; 526/284; 526/326
[58] Field of Search ............... 526/293, 313, 310, 311, 526/312, 284, 289, 326; 351/159, 160

[56] References Cited

U.S. PATENT DOCUMENTS

| 3,751,399 | 8/1973 | Lee, Jr. ........................... 526/323.1 X |
| 3,890,273 | 6/1975 | Saito .................................... 526/313 |
| 3,923,740 | 12/1975 | Schmitt ........................... 526/313 X |
| 4,090,997 | 5/1978 | Patel .............................. 526/323.1 X |
| 4,156,766 | 5/1979 | Feldt .................................... 526/313 |

FOREIGN PATENT DOCUMENTS 45-15640 6/1970 Japan .................................. 526/313

Primary Examiner—C. A. Henderson
Attorney, Agent, or Firm—Norbert P. Holler; Anthony Lagani, Jr.

[57] ABSTRACT

The present invention relates to a copolymer for high refractive lens having a refractive index equal to or higher than 1.55, obtained by copolymerization of one or more of the first monomer component having the formula (I)

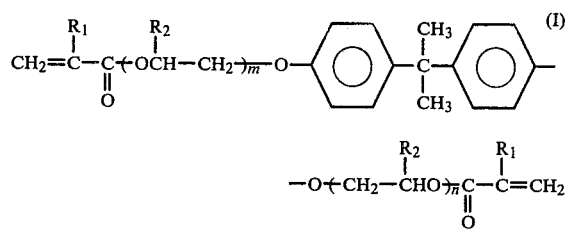

wherein $R_1$ signifies hydrogen atom or methyl radical, $R_2$ signifies hydrogen atom or methyl radical, and m and n signify integers 0 to 4 in total, with one or more of the radically polymerizable second monomer component, homo-polymer of which has a refractive index equal to or higher than 1.55 and, if necessary, with the radically polymerizable third monomer component, the homo-polymer of which has a refractive index lower than 1.55 and to the lens prepared from said copolymer.

10 Claims, No Drawings

HIGHLY REFRACTIVE COPOLYMER OF AN ETHYLINICALLY UNSATURATED ALKYLENE OXIDE OF BIS-PHENOL-A AND AN ETHYLINICALLY UNSATURATED AROMATIC COMPOUND FOR LENS AND A LENS PREPARED THEREFROM

BACKGROUND OF THE INVENTION

The present invention relates to an organic glass copolymer for lens and a lens prepared therefrom. More particularly, the present invention relates to an excellent copolymer for lens having a high refractive index and the lens prepared therefrom.

In recent years organic glass lenses have come into wide use in place of inorganic glass lenses. Organic glass has characteristics which inorganic glass does not possess, namely advantages such as light weight property, higher safety, easier processability and good dyeability etc. Polymethylmethacrylate, polydiethyleneglycol bis-allylcarbonate, polycarbonate, polystyrene and the like have been widely utilized in various fields.

Especially in the field of the lens of ophthalmic glasses, light weight property and safety (impact resistance property) are strongly required. Therefore great hopes are entertained for organic glass having properties matched to those requirements. However, since a castable organic glass generally has a low refractive index ($n_D^{20} \approx 1.50$), organic glass has such defects that the lens composed thereof inevitably has a significantly great thickness compared to those of inorganic glass. On the one hand, organic glass having a relatively high refractive index, such as polycarbonate or polystyrene etc, cannot be processed by casting. Thus they are unsuitable for production of many kinds of articles, such as lens of ophthalmic glasses. The organic glass is actually restricted in their field of use to a certain narrow range because of their vulnerability to scratches in actual use caused by their low surface hardness, poor solvent resistance, low heat-resistance etc.

Various attempts have been made to heighten the refractive index of organic glasses.

For example polystyrene cannot be used as a material for lens because of their low surface hardness, inferior heat resistance, low solvent resistance, and low weatherability, and low dyeability, though it has a relatively high refractive index of 1.59. A method for improving surface hardness, weatherability of styrene by copolymerizing it with methylmethacrylate or acrylonitrile has already been known, but by this improvement, heat resistance and solvent resistance are hardly improved, though surface hardness and weatherability are improved in some degree, and further, the refractive index is gradually lowered in the improvement as the ratio of the second component in the copolymerization increases. Though the refractive indexes of the organic glass made of polyvinylnaphthalene, polyvinylcarbazol and polynaphthyl-methacrylate are relatively high, they have a high degree of self-coloring, and are very low in impact resistance and weatherability. Therefore these substances can never be used as a material for lens.

The inventors made an intense survey of various attempts to improve organic glasses. As a result of the survey on previous attempts to overcome the defects in the prior arts in the field of organic glasses, it has now been found that an organic glass having high refractive index, and having excellent surface hardness, solvent, head- and impact-resistance, good coatability, and the like can be obtained by copolymerizing a specific bifunctional acrylate or dimethacrylate with radically polymerizable monomer, homo-polymer thereof having a refractive index equal to or higher than 1.55.

SUMMARY OF THE INVENTION

It has surprisingly been found that a copolymer having a high refractive index may be prepared by copolymerizing one or more of a first monomer component having the formula (I)

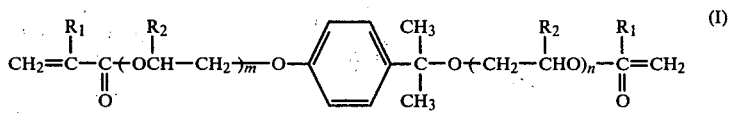

wherein $R_1$ signifies a hydrogen or methyl radical, $R_2$ is a hydrogen or methyl radical, and m and n are integers of 0 to 4 total, with one or more of a radically polymerizable second monomer component, the homopolymer of which has a refractive index of 1.55 or greater. A third radically polymerizable monomer component may be included.

The object of the invention is to provide an organic glass copolymer having a refractive index equal to or higher than 1.55 and used for lens and the lens obtained therefrom.

Another object of the invention is to provide an organic glass copolymer for lens having a desirable clarity and non-coloring and the lens made thereof.

A further object of the invention is to provide an organic glass copolymer for lens having an excellent surface hardness, high solvent- and heat-resistance and good processability and a lens made thereof.

DETAILED DESCRIPTION OF THE INVENTION

The copolymer for lens of the present invention can be obtained by copolymerizing one or more of the first monomer component having the general formula (I)

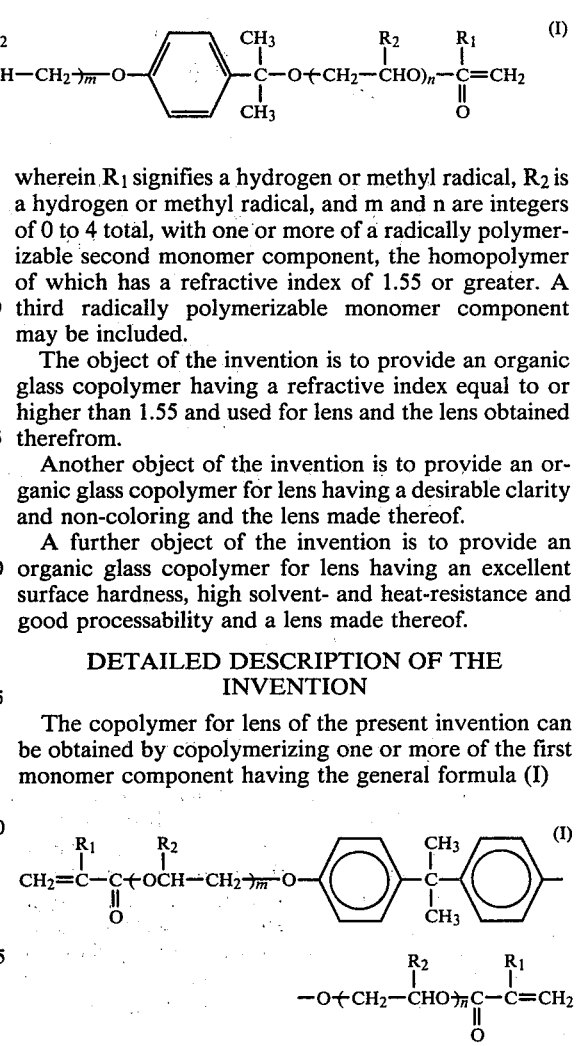

wherein $R_1$ signifies hydrogen atom or methyl radical, $R_2$ signifies hydrogen atom or methyl radical and m and n signify integers 0 to 4 in total, with one or more of the radically polymerizable second monomer component, homopolymer thereof having a refractive index equal to or higher than 1.55.

The first monomer component used in the invention as the main component and having the general formula (I) is used in an amount of about 3 to 70 percent by weight, but preferably about 5 to 40% by weight. When the first monomer component is used in an amount less than 3 percent by weight, the surface hardness, solvent resistance, heat resistance, coatability, processability of the obtained copolymer cannot be improved. Furthermore, when the first monomer component is used in an amount over 70 percent by weight, impact resistance and processability of the obtained copolymer are markedly lowered, though the surface hardness of the copolymer is highly improved.

In the present invention any polymers can be used as the radically polymerizable second monomer if they satisfy the above requirements and is itself colorless and clear. However, among them, the monomer components having the following formula (II) to (IV) are especially preferable to the second monomer component used in the invention.

(a) 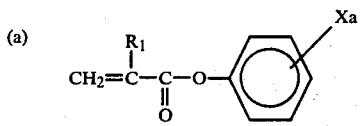 (II)

wherein $R_1$ has the same meaning as the above, X signifies hydrogen, chlorine or bromine atom or methoxy, amino, nitro, phenyl or phenoxy radical and a signifies 1 or 2.

(b) 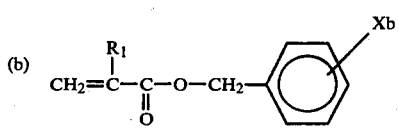 (III)

wherein $R_1$ and X have the same meaning as the above and b signifies 1 or 2.

(c) 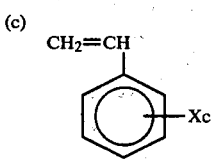 (IV)

wherein X has the same meaning as the above and c signifies 1 or 2.

Besides the above mentioned compounds, other compounds can be added in the invention. Namely the following compounds can be added to the copolymerization of the invention as the third components; for example, naphthylmethacrylates such as α-naphthylmethacrylate, β-naphthylmethacrylate; phenoxyethylacrylate; phenoxyethylmethacrylate; vinylnaphthalenes such as 1-vinylnaphthalene, 2-vinylnaphthalene etc; and other monomers such as 4-vinylbiphenyl, di-vinylbenzene, or vinylphenylsulfide etc.

Although the amount of the second component used in the invention varies according to the kinds and amounts of the first components used, and thus cannot be precisely defined, the second component is preferably used in an amount ranging from 30 to 97 percent by weight. When the second component is used in an amount less than 30 percent by weight, the impact resistance of the product becomes lower because of its high cross-linking degree, and when the second component is used in an amount over 97 percent by weight, the surface hardness and solvent resistance cannot be further improved.

Although in the invention, the desired copolymer for lens having a high refractive index can easily be obtained by copolymerizing the first monomer component and the second monomer component, it is preferable to copolymerize further with the third monomer component mentioned above, in order to improve the dyeability, impact resistance, weatherability etc. of the copolymer. The third component is radically polymerizable and has a refractive index less than 1.55. It is used in the copolymerization in an amount of 0 to 67 percent by weight. In general, the copolymer obtained from the copolymerization rapidly lowers its impact resistance as the refractive index becomes higher. To prevent the lowering of the impact resistance of the copolymer, it is preferably to add alkyl(meta)-acrylic acid ester such as butylmethacrylate to the copolymerization. Furthermore, to improve the dyeability and weatherability of the copolymer, it is preferable to copolymerize diethyleneglycolbis-allylcarbonate, methyl methacrylate etc.

In order to initiate the copolymerization of the invention, conventional copolymerization initiator such as benzoylperoxide, diisopropylperoxydicarbonate, 2,2'-azobisisobutyronitrile etc. can be used.

To prepare the copolymer for lens of the present invention, one or more of the first monomer, one or more of the second monomer and initiator are mixed, if necessary, together with the third monomer to prepare a casting syrup and the said syrup is then poured into a casting mold assembled with molds (glass-made or metal made) and gaskets and then is curued by means of heating or ultraviolet light irradiation etc. It is also possible to cure the casting syrup by irradiation without the initiator.

The organic glass copolymer for lens of the present invention has such characteristics whereby it is able to impart a high strength to the copolymer while overcoming the defects in the high refractive organic glass of the prior arts, wherein several faults such as deep self-coloring, brittleness, deficient surface hardness, unsatisfied solvent resistance, insufficient heat resistance and bad coatability become evident during attempts to improve the refractive index of organic glasses.

Since the copolymer for lens of the present invention, not only can be used for the lens of the ophthalmic glasses, but also can expand the range of its use to lens for camera as well as other optical elements, the present invention will make a great contribution to the field of industry.

The present invention will be elucidated with reference to working examples and reference examples. However the following descriptions are made only as illustration, without any intention to restrict the range of use of the present invention.

Percents or parts indicated in the following are made on weight basis without any specific mention.

EXAMPLE 1

Mixture of 20 parts of bisphenol A dimethacrylate, 80 parts of phenylmethacrylate and 0.1 parts of benzoylperoxide was poured into a casting mold composed of a glass mold for shaping lens having a diameter of 65 cm and a gasket made of polyethylene, and was held for 24 hours in a hot air furnace kept at a temperature of 65° C. After keeping it in the furnace for 2 hours at 80° C. and for 2 hours at 100° C., the copolymer was then removed from the mold and the refractive index, hardness, impact resistance, solvent resistance, heat resistance, processability, coatability thereof were determined. The obtained lens was colorless and clear, and had a refractive index of 1.572 and a hardness of 4 H pencil. The heat resistance, impact resistance, solvent resistance, processability and coatability were superior to those of homopolymer of phenylmethacrylate.

The refractive index was measured by an Abbe's refractometer and pencil hardness was measured according to JIS K-5400. The other properties were evaluated by the methods described hereinafter.

Heat resistance: The lens obtained was examined with the naked eye after standing as it was for 3 hours in a hot furnace having a temperature of 120° C. and the ones having no self-coloring and no contortion of surface came up to the desired standard.

Solvent-resistance: The lens obtained was dipped for seven days into each solvent of methanol, aceton, benzene and toluene at room temperature, and the ones having no blur on the surface were considered to be up to the required standard.

Processability: Lens obtained was processed by a lens grinder, and the ones having no chipped edge and having a flat cutting surface passed the test.

Impact-resistance: A testing according to FDA standard was made on a lens having a central thickness of 2 mm.

Coatability: Lens obtained was vacuum-deposition with glass on the surface of lens and then it was immersed in a warm water having a temperature of 80° C. for 24 hours and the ones having no peeling of the coated glass layer passed the test.

EXAMPLES 2–14

Lenses having various composition were prepared by the same method as in Example 1, and examined under the same test methods. However these examples contained ones which were prepared under continuous temperature raising copolymerization method. The results are shown in Table 1.

As being apparent from Table 1, the lenses obtained by the present process are far superior to the conventional ones shown in the comparative test on various properties necessary for optical lens such as refractive index, hardness, solvent-resistance, heat-resistance, processability, impact-resistance, coatability and the like.

TABLE 1

| Example No. | Monomer Composition ( ) parts | Refractive index, $n_D^{20}$ | Hardness | Color | Solvent resistance | Heat resistance | Processability | Impact Resistance | Coatability |
|---|---|---|---|---|---|---|---|---|---|
| Comparative Example 1 | CR-39 (100) | 1.499 | 2H | Colorless | o | o | o | o | o |
| Comparative Example 2 | MMA (100) | 1.490 | 2H | Colorless | x | x | o | o | x |
| Comparative Example 3 | St (100) | 1.589 | HB | Colorless | x | x | x | o | x |
| Comparative Example 4 | PhMA (100) | 1.572 | F | Colorless | x | x | o | o | x |
| Comparative Example 5 | o-CSt (100) | 1.610 | HB | Colorless | x | x | x | x | x |
| Comparative Example 6 | p-BPhMA (100) | 1.613 | 2H | Brown | x | x | x | x | x |
| Comparative Example 7 | 1-vinyl-naphthalene (100) | 1.682 | 2H | " | x | x | x | x | x |
| Comparative Example 8 | N-vinyl-carbazol (100) | 1.683 | 2H | " | x | x | x | x | x |
| Comparative Example 9 | BPDMA/o-CSt (1/99) | 1.608 | H | Colorless | x | x | x | x | x |
| Example 1 | BPDMA/PhMA (20/80) | 1.572 | 4H | Colorless | o | o | o | o | o |
| Example 2 | BPDMA/St (20/80) | 1.588 | 2H | Colorless | o | o | o | o | o |
| Example 3 | BPDMA/o-CSt (20/80) | 1.604 | 2H | Colorless | o | o | o | o | o |
| Example 4 | BPDMA/BzMA (50/50) | 1.573 | 2H | Colorless | o | o | o | o | o |
| Example 5 | BMEPP/PhMA (50/50) | 1.570 | 2H | Colorless | o | o | o | o | o |
| Example 6 | BMEPP/St (50/50) | 1.580 | H | Colorless | o | o | o | o | o |
| Example 7 | BMEPP/o-CSt (50/50) | 1.591 | H | Colorless | o | o | o | o | o |
| Example 8 | BMEPP/BzMA (60/40) | 1.570 | H | Colorless | o | o | o | o | o |
| Example 9 | BPDMA/DCSt (40/60) | 1.603 | 2H | Pale Yellow | o | o | o | x | o |
| Example 10 | BPDMA/POA | 1.570 | H | Color- | o | o | o | o | o |

TABLE 1-continued

| Example No. | Monomer Composition ( ) parts | Refractive index, $n_D^{20}$ | Hardness | Color | Solvent resistance | Heat resistance | Processability | Impact Resistance | Coatability |
|---|---|---|---|---|---|---|---|---|---|
| | (50/50) | | | less | | | | | |
| Example 11 | BPDMA/o-CSt (80/20) | 1.580 | 4H | Colorless | o | o | x | x | o |
| Example 12 | BPDMA/DCSt/MMA (40/40/20) | 1.572 | 3H | Pale Yellow | o | o | o | o | o |
| Example 13 | BMEPP/p-BPhMA/ BuMA (40/40/20) | 1.570 | 2H | Colorless | o | o | o | o | o |
| Example 14 | BPDMA/PhMA/ CR39 (10/70/20) | 1.556 | 2H | Colorless | o | o | o | o | o |

Note:
(1) The abbreviated words in the column of monomer composition signify the following meanings.
CR 39: diethyleneglycol-bisarylcarbonate
MMA: methylmethacrylate
St: styrene
o-CSt: ortho-chlorostyrene
PhMA: phenylmethacrylate
BzMA: benzylmethacrylate
DCSt: 2,6-dichlorostyrene
BPDMA: bisphenol A dimethacrylate
BMEPP: 2,2-bis(4-methacroyloxyethoxyphenyl)propane
BuMA: butylmethacrylate
p-BPhMA: para-bromophenylmethacrylate
POA: phenoxyethylacrylate
(2) The following marks in the column of the solvent-resistance, heat-resistance, processability, impact-resistance and coatability have the following meanings.
o: excellent
x: inferior

What we claim are:

1. An optical lens prepared from a highly refractive copolymer having a refractive index equal to or greater than 1.55 wherein said copolymer comprises:
   (1) about 3 to about 70 percent by weight of a first component having the general formula

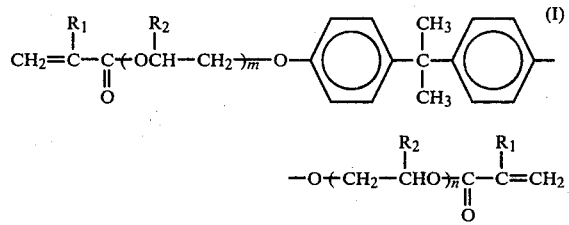

wherein $R_1$ is H or methyl; $R_2$ is H or methyl; m and n are zero or an integer of 1 to 4; and
   (2) about 97 to about 30 percent by weight of a radially polymerizable second component selected from the group consisting of (a) 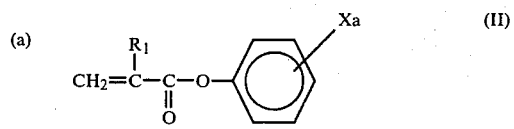 (II)

(b) 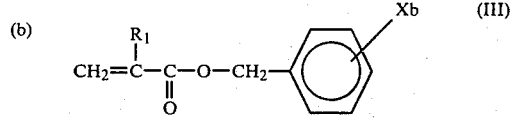 (III)

(c)  (IV)

wherein R has the same meaning as described above; X is H, chlorine bromine, methoxy, amino, nitro, phenyl or phenoxy and a, b and c are each 1 or 2.

2. An optical lens according to claim 1 wherein the highly refractive copolymer includes a radically polymerizable third monomer, the homopolymer of which has a refractive index lower than 1.55.

3. The optical lens of claim 1 wherein the first component of the copolymer is present at about 5 to about 40 weight % and the second component is present at about 95 to about 60% by weight.

4. The optical lens according to claim 2 wherein the highly refractive copolymer comprises about 3 to about 70 percent by weight of the first monomer; about 30 to about 97 percent by weight of the second monomer and about 0 to about 67 percent by weight of the third monomer.

5. The optical lens of claim 1 wherein the lens is an ophthalmic device.

6. An optical lens according to claim 1 wherein the highly refractive copolymer contain as said first monomer having the formula (I), bisphenol A dimethacrylate or 2,2-bis(4-methacryloxy-ethoxyphenyl) propane.

7. An optical lens according to claim 1 wherein the highly refractive copolymer contains as said second monomer having the formula (II), phenylmethacrylate, phenoxyethylacrylate or p-bromophenylmethacrylate.

8. An optical lens according to claim 1 wherein the highly refractive copolymer contains as said second monomer having formula (III), benzylmethacrylate.

9. An optical lens according to claim 1 wherein the highly refractive copolymer contains as said second monomer having the formula (IV), styrene, O-chlorostyrene or 2,6-dichlorostyrene.

10. An optical lens according to claim 2 wherein the highly refractive copolymer contains as said third monomer naphthyl-methacrylate, -naphthylmethacrylate, phenoxyethylacrylate, phenoxyethylmethacrylate, 1-vinylnaphthalene, 2-vinyl-naphthalene, 4-vinyl-biphenyl, divinylbenzene or vinylphenylsulfide.

* * * * *